(12) United States Patent
Biller et al.

(10) Patent No.: US 12,001,310 B2
(45) Date of Patent: Jun. 4, 2024

(54) APPROXIMATING ACTIVITY LOADS IN DATABASES USING SMOOTHED TIME SERIES

(71) Applicant: International Business Machines Corporation, Armonk, NY (US)

(72) Inventors: Ofer Haim Biller, Neve Boker (IL); Oded Sofer, Midreshet Ben Gurion (IL)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 17/222,010

(22) Filed: Apr. 5, 2021

(65) Prior Publication Data

US 2022/0318119 A1   Oct. 6, 2022

(51) Int. Cl.
*G06F 11/34* (2006.01)
*G06F 11/30* (2006.01)
*G06F 16/22* (2019.01)

(52) U.S. Cl.
CPC ........ *G06F 11/3419* (2013.01); *G06F 11/302* (2013.01); *G06F 16/22* (2019.01)

(58) Field of Classification Search
CPC ..... G06F 11/3419; G06F 16/22; G06F 11/302
USPC ....................................................... 707/609
See application file for complete search history.

(56) References Cited

U.S. PATENT DOCUMENTS

| | | | |
|---|---|---|---|
| 7,310,590 B1* | 12/2007 | Bansal | G06F 11/0751 703/22 |
| 8,566,483 B1 | 10/2013 | Chen et al. | |
| 8,799,225 B2 | 8/2014 | Vaitzblit et al. | |
| 10,380,290 B1* | 8/2019 | Rasekh | G06F 30/367 |
| 2003/0200134 A1 | 10/2003 | Leonard et al. | |
| 2005/0089063 A1* | 4/2005 | Haruna | H04L 67/1008 370/468 |
| 2006/0191161 A1* | 8/2006 | Wunderlin | D06F 34/08 34/562 |
| 2013/0046725 A1* | 2/2013 | Cammert | G06F 16/24568 706/58 |
| 2014/0258254 A1 | 9/2014 | Suleiman et al. | |
| 2015/0351670 A1* | 12/2015 | Vanslyke | A61B 5/14546 600/301 |
| 2016/0336154 A1* | 11/2016 | Watanabe | H01J 37/32926 |
| 2018/0278634 A1* | 9/2018 | Adir | G06F 21/577 |
| 2019/0042727 A1 | 2/2019 | Rodniansky | |
| 2019/0370229 A1 | 12/2019 | Guo et al. | |

OTHER PUBLICATIONS

Dix ("The Power of Time Series Databases with Paul Dix", Screaming in the Cloud Podcast, Oct. 23, 2019) (Year: 2019).*
"Converting table data to a time series", GitHub, Mar. 2, 2021, 6 pages. https://cloud.ibm.com/docs/sql-query?topic=sql-query-examples_common.

(Continued)

*Primary Examiner* — Apu M Mofiz
*Assistant Examiner* — Farhad Agharahimi
(74) *Attorney, Agent, or Firm* — Tihon Poltavets

(57) ABSTRACT

An example system includes a processor to monitor activity on a database server to generate an events stream. The processor can convert the events stream into a time series that approximates activity load at the database server using an exponential smoothing. The processor can also send the time series to a streaming analytics engine.

20 Claims, 7 Drawing Sheets

(56) References Cited

OTHER PUBLICATIONS

Cao, Wei et al., "Timon: A Timestamped Event Database for Efficient Telemetry Data Processing and Analytics", SIGMOD '20: Proceedings of the 2020 ACM SIGMOD International Conference on Management of Data, Jun. 2020, 15 pages.

Mintz, Josh, "IBM Releases SQL-Native Time Series Processing in Cloud", IBM Cloud Technologies, Jul. 3, 2019, 9 pages. https://www.ibm.com/cloud/blog/announcements/ibm-releases-sql-native-time-series-processing-in-cloud.

* cited by examiner

300

APPROXIMATING ACTIVITY LOADS IN DATABASES USING SMOOTHED TIME SERIES

BACKGROUND

The present techniques relate to analysis of data streams. More specifically, the techniques relate to analysis of data streams in databases.

In order to gather statistics for describing activity of database users, the loads of their activities may be measured during given timeframe. However, user activities are a set of separate events in time, and therefore is aggregated in some manner in order to build activity load statistics. One method of aggregating user activities is dividing the time into time windows of a predefined duration. For example, the time windows can be either sub sequential or overlapping, in which sliding windows may be used. However, both time window methods have some drawbacks which are especially problematic when dealing with large data streams. For example, these methods may use both high storage capacity and computation resources which might impose problems when implementing the methods on larger scales.

In addition, the statistical data models used by existing unsupervised and non-time-series methods are based on specific time frames or on approximate aggregations of the times scales. For example, the specific time-frames may be a number of minutes, hourly, daily, or some other time frame. However, some applications may benefit from multiple time resolutions for every event at the time the event is captured. Moreover, the cost of maintaining multiple statistical models, data models per time-frame, or converting from one to another may be very expensive. Managing several time windows simultaneously in existing methods may thus be expensive both in time and disk space.

SUMMARY

According to an embodiment described herein, a system can include processor to monitor activity on a database server to generate an events stream. The processor can also further convert the events stream into a time series that approximates activity load at the database server using an exponential smoothing. The processor can also send the time series to a streaming analytics engine. Thus, any number of time series analytics may be executed on the activity of the database server in real-time. Optionally, the processor is to monitor activity per each user or per each database. In this embodiment, the additional monitoring may enable approximation per user or database in real-time. Preferably, the exponential smoothing is based on a density function of the activity load that uses a smoothing exponential average of events in the events stream. In this embodiment, more recent events receive increasingly higher weights than older events. Preferably, the exponential smoothing is calculated based on a current event timestamp and a previous event timestamp in the events stream. In this embodiment, the timestamps enable the smoothing to be calculated using minimal resources. Optionally, the processor is to approximate an activity load of database server for a number of simulated time windows in parallel. In this embodiment, significant data storage may be saved by approximating simulated time windows in parallel. Preferably, the processor is to approximate an updated activity load of the database server at each detected additional event in the events stream. In this embodiment, processing resources are saved by not continually calculating activity load using windows of time. Optionally, the streaming analytics engine is to perform anomaly detection on the time series. In this embodiment, anomalies can be detected in real-time on the activity in the database and on different time resolutions.

According to another embodiment described herein, a method can include monitoring, via a processor, activity on database server to generate an events stream. The method can further include converting, via the processor, the events stream into a time series that approximates an activity load of database server using an exponential smoothing. The method can also further include sending, via the processor, the time series to a streaming analytics engine. Thus, any number of time series analytics may be executed on the activity of the database server. Optionally, the method can also include separating the events stream into per-user streams or per-database streams. In this embodiment, the separated streams may enable approximation per user or database in real-time. Preferably, the method can also include receiving an adjustable smoothing factor and converting the events stream using the exponential smoothing based on the smoothing factor. In this embodiment, the smoothing factor enables adjustable simulated time windows. Preferably, the method can also include approximating an updated activity load of the database server at each detected additional event in the events stream. In this embodiment, processing resources are saved by not continually calculating activity load using windows of time. Optionally, executing the streaming analytics engine includes predicting a future activity load based on the time series. In this embodiment, a future activity load can be predicted in real-time. Optionally, executing the streaming analytics engine includes calculating statistics on the time series to generate anomalies in real time in response to detecting that a current value of the time series exceeds a deviation threshold. In this embodiment, anomalies can be detected in real-time on the activity in the database. Optionally, executing the streaming analytics engine includes clustering the time series with another calculated time series. In this embodiment, anomaly detection is enabled by comparison with the clusters.

According to another embodiment described herein, a computer program product for approximating activity loads in databases can include computer-readable storage medium having program code embodied therewith. The computer readable storage medium is not a transitory signal per se. The program code executable by a processor to cause the processor to monitor activity on a database server to generate an events stream. The program code can also cause the processor to convert the events stream into a time series that approximates activity load at the database server using an exponential smoothing. The program code can also cause the processor to send the time series to a streaming analytics engine. Optionally, the program code can also cause the processor to separate the events stream into per-user streams or per-database streams. In this embodiment, the separated streams may enable approximation per user or per database. Preferably, the program code can cause the processor to approximate an updated activity load of the database server at each detected additional event in the events stream. In this embodiment, processing resources are saved by not continually calculating activity load using windows of time. Optionally, the program code can also cause the processor to also further predict a future activity load based on the time series. In this embodiment, a future activity load can be predicted in real-time. Optionally, the program code can also cause the processor to also further calculate statistics on the time series to generate anomalies in real time in response to detecting that a current value of the time series exceeds a deviation threshold. In this embodiment, anomalies can be detected in real-time on the activity in the database. Optionally, the program code can also cause the processor to also further cluster the time series with another calculated time series. In this embodiment, anomaly detection is enabled by comparison with the clusters.

DETAILED DESCRIPTION

According to embodiments of the present disclosure, a system includes a processor to monitor activity on a database server to generate an events stream. The processor can convert the events stream into a time series that approximates activity load at the database server using an exponential smoothing. The processor can also execute a streaming analytics engine on the time series. Thus, the embodiments provide a fast, light weight method which convert sequence of events into time series enabling application to many existing methods which work on time series for analytic. For example, the embodiments may be used with any suitable prediction and outlier detection techniques. In addition, embodiments of the present disclosure enable a continuous approximation of activity load without a need for handling any kind of activity windows. Thus, the use of continuous approximation of the activity load may enable analyzing any time-window without the need to maintain time-windows aggregation statistics. The embodiments also use minimal calculations and no additional storage except previous value and previous timestamp of the event. The embodiments can thus achieve very similar results to other methods with much less resources used. Furthermore, the embodiments can evaluate different time frames of activity in parallel, which may double resource usage in existing methods. The embodiments thus enable efficient and flexible time resolution data-streaming-analytics. Moreover, the evaluation of different time frames of activity may improve detection of anomalies and other potential applications using the embodiments described herein.

Figure 1:
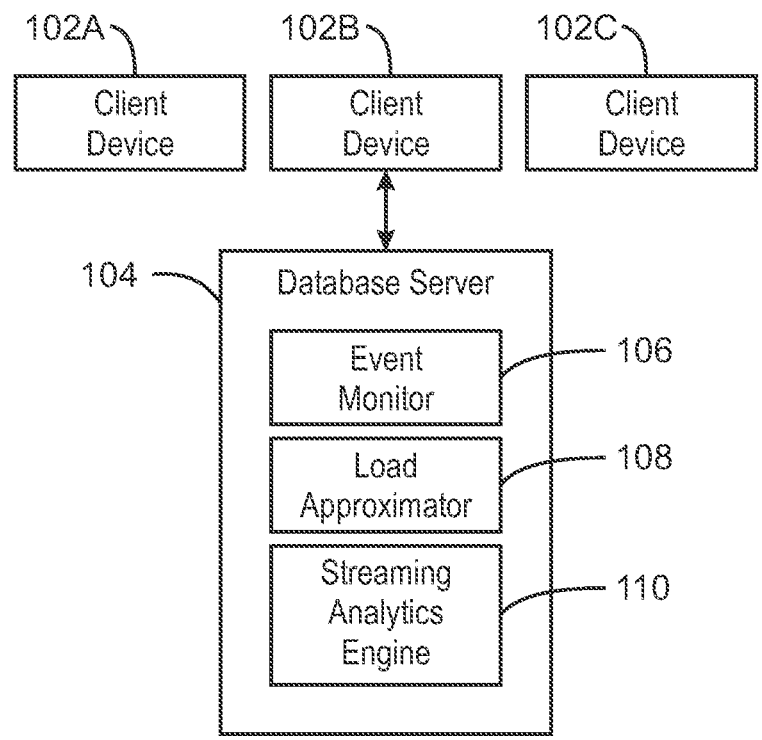
FIG. 1 is a block diagram of an example system for approximating activity loads in databases using smoothed time series.

With reference now to FIG. 1, a block diagram shows an example system for approximating activity loads in databases using smoothed time series. The example system 100 of FIG. 1 includes a number of client devices 102A, 102B, and 102C. The system 100 also includes a database server 104 communicatively coupled to the client devices 102A, 102B, and 102C. The database server 104 includes an event monitor 106, a load approximator 108, and a streaming analytics engine 110.

In the example of FIG. 1, the event monitor 106 of the database server 104 can monitor events received at the database server 104 from the client devices 102A, 102B, and 102C. The event monitor 106 may generate an events stream based on the monitored events. In various examples, the events stream may be separated per machine or per user. For example, the events stream may be separated based on originating Internet Protocol (IP) address or username. In some examples, the events stream may be separated by type of actions. For example, the events stream may be separated based on an SQL VERB that is used, an application that is used, etc.

In various examples, the load approximator 108 can convert the separate events stream into a time series that describes activity density. In various examples, the load approximator 108 can organize the time domain as a discrete series. For example, every millisecond, or another time interval of any other magnitude, may be considered a separate interval which can either contain an event or not. Event occurrences in the events stream therefore can be described as a binary sequence (B(n)). For example, each of the discrete time intervals may be considered to have the value of one if the event occurred at that millisecond and zero otherwise. In some examples, the load approximator 108 may convert the separate events stream into a time series using exponential smoothing. A function for calculating a smoothing exponential average of the binary series B(n) could be used to evaluate the density function of the activity. For example, a function F(n) could be calculated using the equation:

$$F(n)=\alpha*B(n)+(1-\alpha)*F(n-1) \qquad \text{Eq. 1}$$

where $\alpha$ is a smoothing factor, and $0<\alpha<1$, and the weight between new values and historical values is adjusted using different $\alpha$ values. For example, with a smaller value for $\alpha$, the function may remember events longer in time in the past. Unlike averaging over a time window, each value may have a different weight. For example, more recent values may have larger weights than older ones. However, calculating F(n) explicitly may not be practical because doing so may involve a calculation operation for every time unit. For example, such calculations may not be practical if the time unit is a millisecond. Therefore, in various examples, the formula of Eq. 1 may be adjusted such that the load approximator 108 may only calculate a value of the function on event time. Thus, the load approximator 108 may calculate the function in response to detecting an event in the event stream from the event monitor 106. For example, the density function of the activity may be approximated using the equation:

$$F(n)=\alpha+F(p)*(1-\alpha)(1-\alpha)^{(n-p)} \qquad \text{Eq. 2}$$

where n is the current event timestamp, and p is a previous event timestamp. In various examples, a simulated time window may be adjusted by adjusting the value of the smoothing factor $\alpha$. For example, because different alpha values provide different weights for historical events versus present events, therefore the different alpha values may be used to control the amount of historical values taken into account. However, the resulting density is an approximation for the activity in the time window because the weight of each event in the simulated window is not equal. In various examples, the value of $\alpha$ may be set such that the simulated time window is a millisecond, a minute, an hour, a shift of any number of hours, a day, a week, etc. Eq. 2 is thus calculated only in event times and provides an approximation to the density of events in a given time window. Because the load approximator 108 may calculate the density function of the activity using Eq. 2 only at event time, the value of B(n) will always be one, and is therefore omitted from Eq. 2. Moreover, approximating the density using Eq. 2 uses minimal calculations and no additional storage except previous value and previous timestamp of the event.

The streaming analytics engine 110 can analyze the approximated activity loads. In various examples, because the activity density is expressed as time series values received upon an event, the streaming analytics engine 110 can any suitable classical time series algorithm to analyze the streaming activity density data. For example, the streaming analytics engine 110 can perform forecasting, data mining, pattern recognition, or machine learning. In the context of machine learning, the streaming analytics engine 110 can perform time series analysis used for clustering, classification, query by content, anomaly detection as well as forecasting. In some examples, the current values of the series can be used as general description of the user behavior when applied on different sub sections of user activity. For example, activities may be divided by user, object, command, records-affected, or source program. In various example, an object may be a data table. In some examples, commands may include SQL VERB. SQL VERBs may include any of the keywords DELETE, INSERT, MERGE, SELECT, or UPDATE. For example, user activity may be divided by SQL VERB, used application, etc., and the streaming analytics engine 110 can detect which part of a user activity is done with different SQL VERBs, applications, etc. Thus, the streaming analytics engine 110 can generate an up-to-date, concise description of a user behavior model that can be used for various goals. For example, the user behavior model may be used for analysis of user behavior, user clustering, risk assessments, among other suitable uses.

Still referring to FIG. 1, in various examples, the streaming analytics engine 110 detect anomalies based on the approximated activity load. In some examples, given the activity density as a time series for each user in a user behavior sub-division of the approximated activity load, the streaming analytics engine 110 can then calculate statistics on the time series. For example, the streaming analytics engine 110 can calculate a mean, minimum, maximum, standard deviation, or any combination thereof, on the time series. In various examples, the streaming analytics engine 110 can calculate these statistics as smoothing averages or in similar manner, such that anomaly alerts may be received in real-time without having to work according to any time window scheduling. In various examples, the streaming analytics engine 110 can generate anomaly detections in real time as the current value of the time series breaks some aspects of the statistics. For example, streaming analytics engine 110 can generate anomaly detections in response to detecting that the approximated activity load exceeds half a standard deviation more than a calculated maximum value.

In some examples, the streaming analytics engine 110 can perform clustering on a times series. For example, users of a database may be clustered together based on their associated time series metrics. As one example, the streaming analytics engine 110 can perform both clustering and classification on received user streams. The classification may be learned by examples to recognize a type of user according to a time series pattern of the type of user, and a clustering may be calculated to determine a group of similar users among the users according to their time series. In various examples, the streaming analytics engine 110 can use these determined groups to find a user whose behavior moves from normal behavior of the group that the user belongs to.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.). For example, the binary representation described above may be theoretical for the understanding of the method and may not actually be calculated or stored in any stage of the system. In various examples, the streaming analytics engine 110 may alternatively be located on a second server (not shown) communicatively coupled to the database server 104, and the database server 104 may include a stream transmitter (not shown) that transmits the time series to the streaming analytics engine 110 on the second server.

Figure 2:
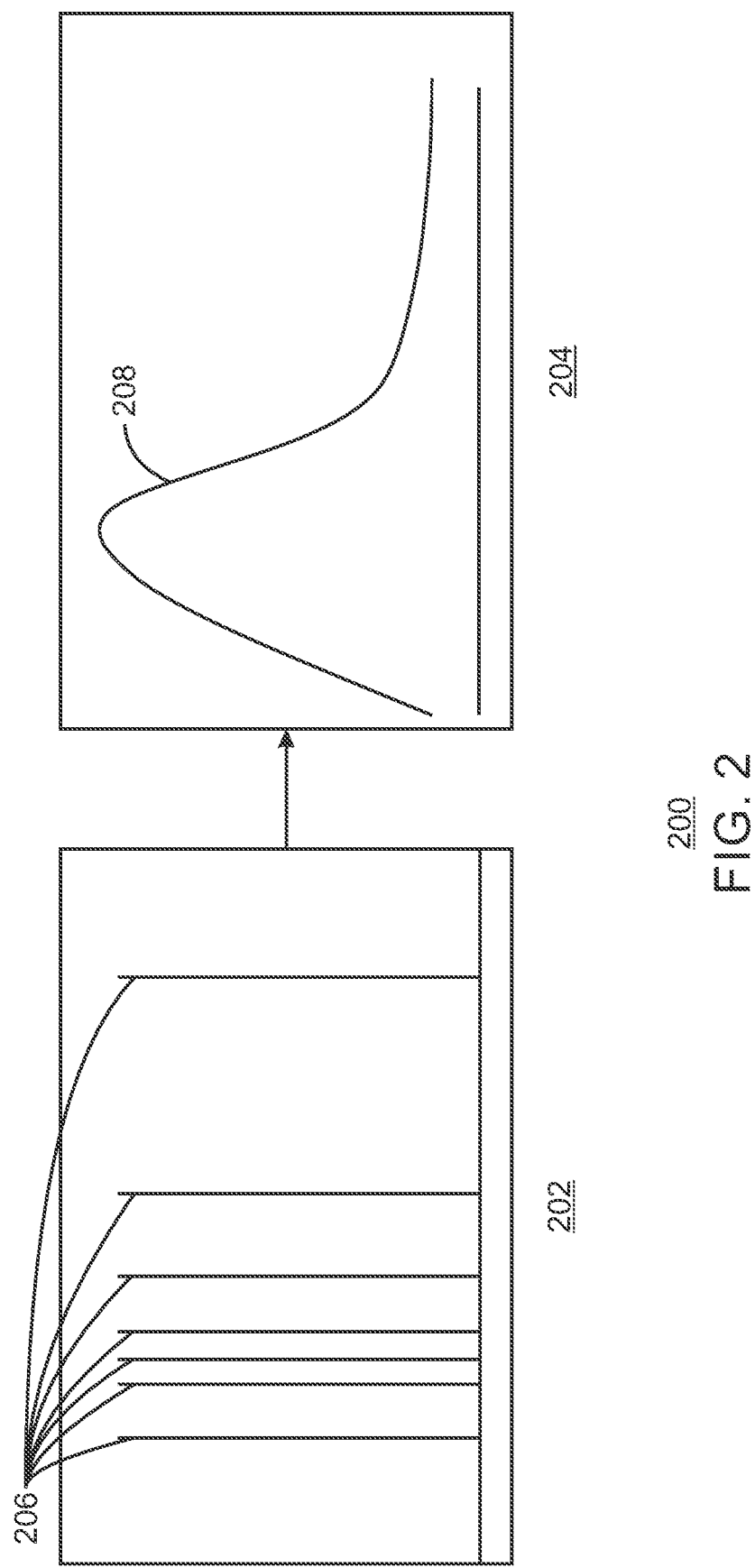
FIG. 2 is an example exponential smoothing of the time series data corresponding to events in a database.

FIG. 2 is a block diagram shows an example exponential smoothing of the time series data corresponding to events in a database. The example exponential smoothing is generally referred to by the reference number 200. FIG. 2 includes a first graph 202 of a binary time series and a second graph 204 of a smoothed time series. The first graph 202 includes a set of events 206 detected at various time intervals. For example, each of the events 206 may have been detected at a particular millisecond, second, minute, hour, etc., depending on the interval used.

In the example of FIG. 2, the events 206 of the first graph 202 may be input into a smoothing function to generate a continuous output 208 of approximated event load values over time. For example, the y axis may indicate the approximated event load at any point in time and the x axis of graph 204 may indicate the passage of time. In various examples, the continuous set of smoothed time series values 208 may be output and used in various applications. For example, the output values 208 may be input into a machine learning model during training to generate a trained machine learning model that can analyze input time series data using various simulated time windows in parallel.

It is to be understood that the block diagram of FIG. 2 is not intended to indicate that the system 100 is to include all of the components shown in FIG. 2. Rather, the exponential smoothing 200 can include fewer or additional components not illustrated in FIG. 2 (e.g., additional client devices, or additional resource servers, etc.).

Figure 3:
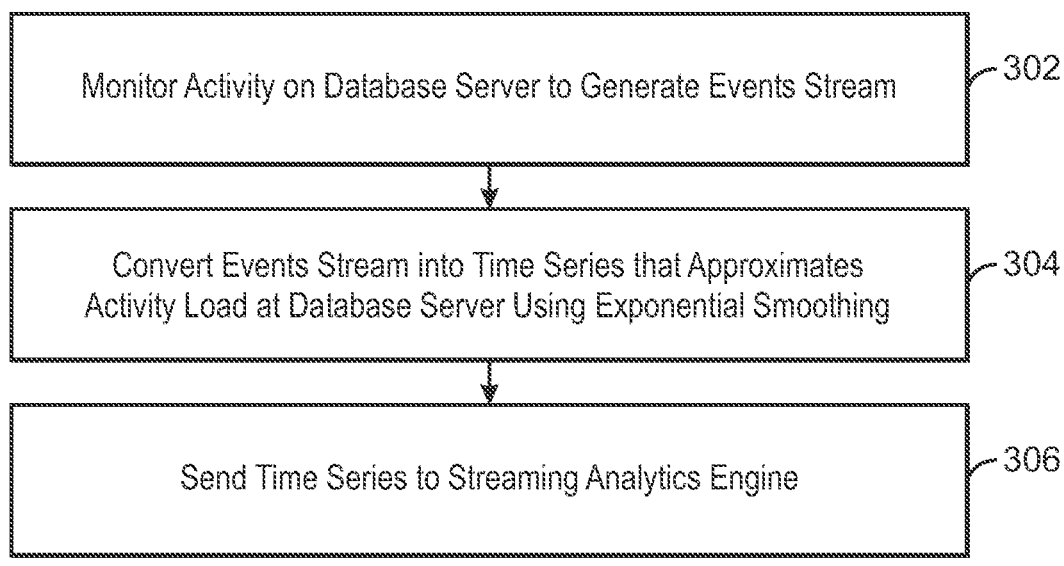
FIG. 3 is a block diagram of an example method that can approximate activity loads in databases using smoothed time series.

FIG. 3 is a process flow diagram of an example method that can approximate activity loads in databases using smoothed time series. The method 300 can be implemented with any suitable computing device, such as the computing device 400 of FIG. 4 and is described with reference to the system 100 and exponential smoothing 200 of FIGS. 1 and 2. For example, the methods described below can be implemented by the processors 402 or 702 of FIGS. 4 and 7.

At block 302, activity on a database server is monitored to generate an events stream. For example, the activity monitored may include a variety of users or databases. In some examples, the events stream may be separated into per-user streams or per-database streams. In various examples, the per-user streams or per-database streams may further be sub-divided into object, command, records-affected, source program, or any combination thereof.

At block 304, the events stream is converted into a time series that approximates activity load at the database server using an exponential smoothing. In some examples, an adjustable smoothing factor may also be received and convert the events stream converted using the exponential smoothing based on the smoothing factor. In various examples, an updated activity load of the database server may be approximated at each detected additional event in the events stream. In various examples, any of a number of streams may be converted into time series.

At block 306, the events stream is sent to a streaming analytics engine. For example, the streaming analytics engine may be on an external server or implemented locally on the same computing device. In various examples, the streaming analytics engine may then be executed on the time series. In some examples, the streaming analytics engine may include a prediction, anomaly detection, or clustering based on the time series. For example, a future activity load may be predicted based on the time series. In some examples, statistics may be calculated on the time series to generate anomalies in real time in response to detecting that a current value of the time series exceeds a deviation threshold. In various examples, the time series may be clustered with another calculated time series. In some example, users of a database may be clustered together based on their associated time series metrics. For example, given the mean values of SELECT, UPDATE, INSERT, for each of a number of user sub streams, the sub streams can be clustered into groups by similarity.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

In some scenarios, the techniques described herein may be implemented in a cloud computing environment. As discussed in more detail below in reference to at least FIGS. 4-7, a computing device configured to approximate activity loads in databases using smoothed time series may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
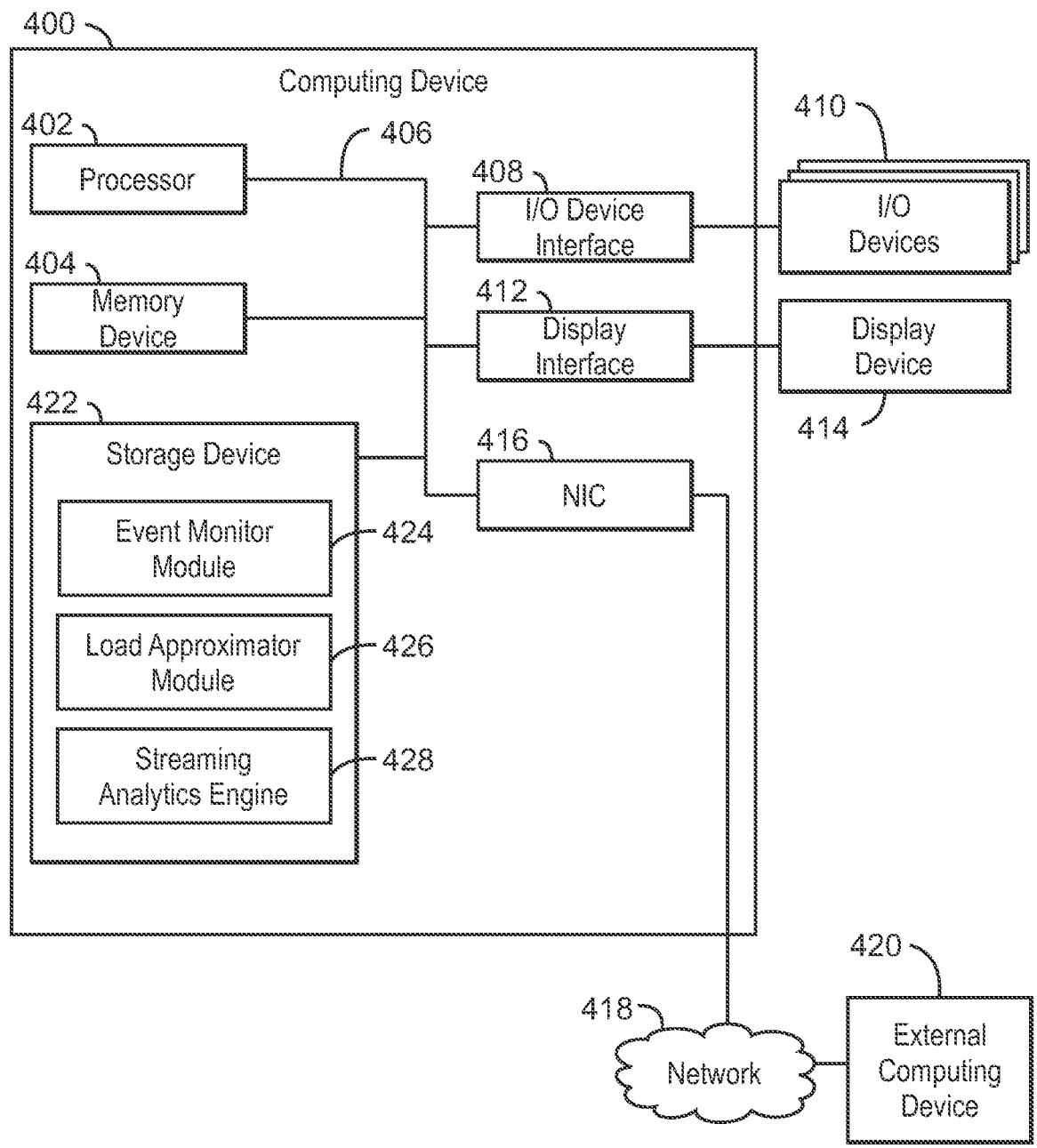
FIG. 4 is a block diagram of an example computing device that can approximate activity loads in databases using smoothed time series.

FIG. 4 is block diagram of an example computing device that can approximate activity loads in databases using smoothed time series. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include an event monitor module 424, a load approximator module 426, and a streaming analytics module 428. The event monitor module 424 can monitor activity on a database server to generate an events stream. In some examples, the monitor module 424 can monitor user activity per each user or per each database. In some examples, the events stream can be separated by parameters into any number of sub streams, such as a per-user streams or per-database streams. The load approximator module 426 can convert the events stream into a time series that approximates activity load at the database server using an exponential smoothing. For example, the exponential smoothing may be based on a density function of the activity load that uses a smoothing exponential average of events in the events stream. In various examples, the exponential smoothing is calculated based on a current event timestamp and a previous event timestamp in the events stream. For example, the exponential smoothing may be calculated using the Eq. 2 above. In various examples, the load approximator module 426 can approximate an activity load of database server for any number of simulated time windows in parallel. For example, the load approximator module 426 can calculate an activity load for each of the simulated time windows using different alpha values. In various examples, the load approximator module 426 can approximate an updated activity load of the database server at each detected additional event in the events stream. The load approximator module 426 can then send the events stream to the streaming analytics engine 428. The streaming analytics engine 428 can execute a streaming analytics engine on the time series. For example, the streaming analytics engine 428 can perform anomaly detection on the time series. In some examples, the streaming analytics engine 428 can cluster activities in the time series into groups based on one or more parameters. For example, the streaming analytics engine 428 can cluster the time series in order to associate a particular user with a group of users. For example, users of a database may be clustered together based on their associated time series parameters. In some examples, the streaming analytics engine 428 can predict a future activity load based on the time series. In various examples, the streaming analytics engine 428 can calculate statistics on the time series to generate anomalies in real time in response to detecting that a current value of the time series exceeds a deviation threshold.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). For example, the streaming analytics engine 428 can be implemented as a client on the storage device 422 and an engine on an external computing device 420. Furthermore, any of the functionalities of the event monitor 424, the load approximator module 426, and the streaming analytics engine 428 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the event monitor module 424, load approximator module 426, and streaming analytics engine 428 can be implemented with logic, wherein the logic, as referred to herein, can include any suitable hardware (e.g., a processor, among others), software (e.g., an application, among others), firmware, or any suitable combination of hardware, software, and firmware.

Figure 5:
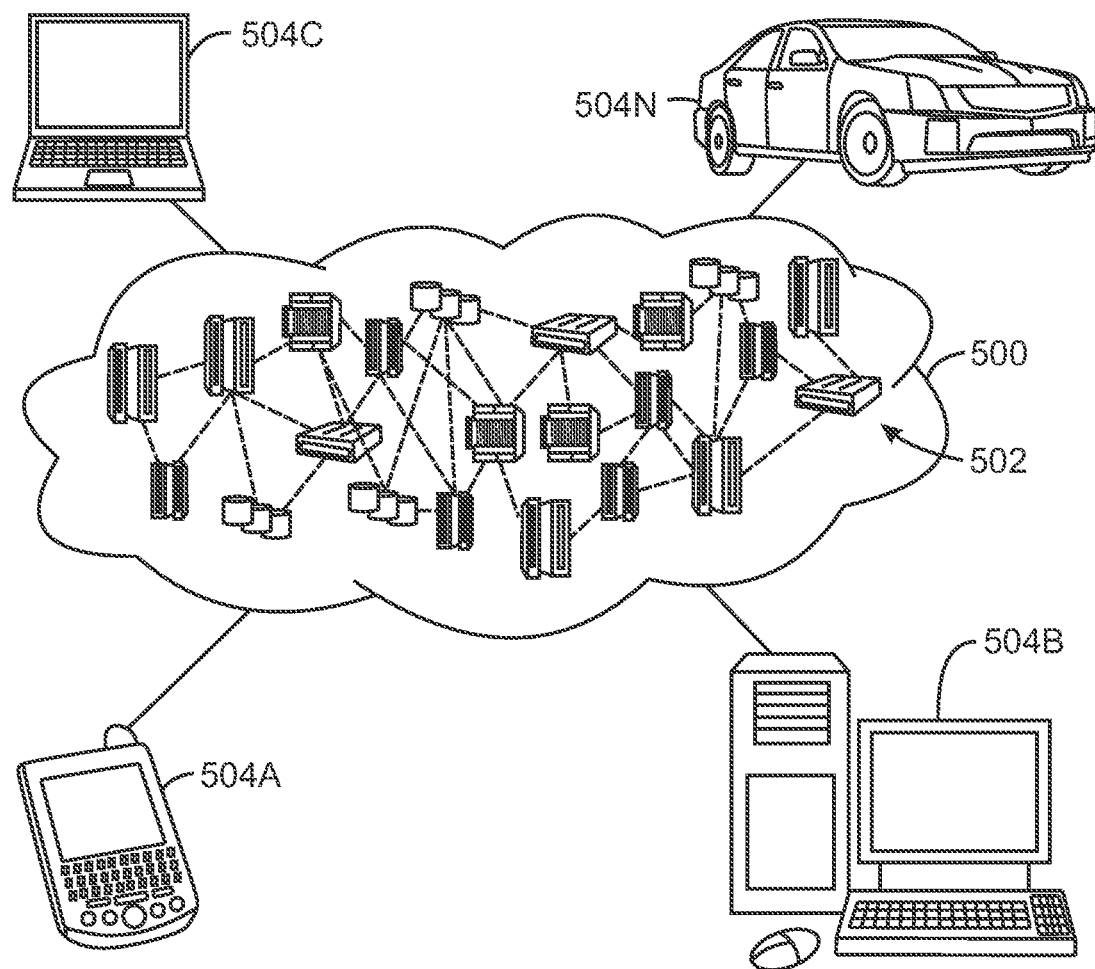
FIG. 5 is a diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
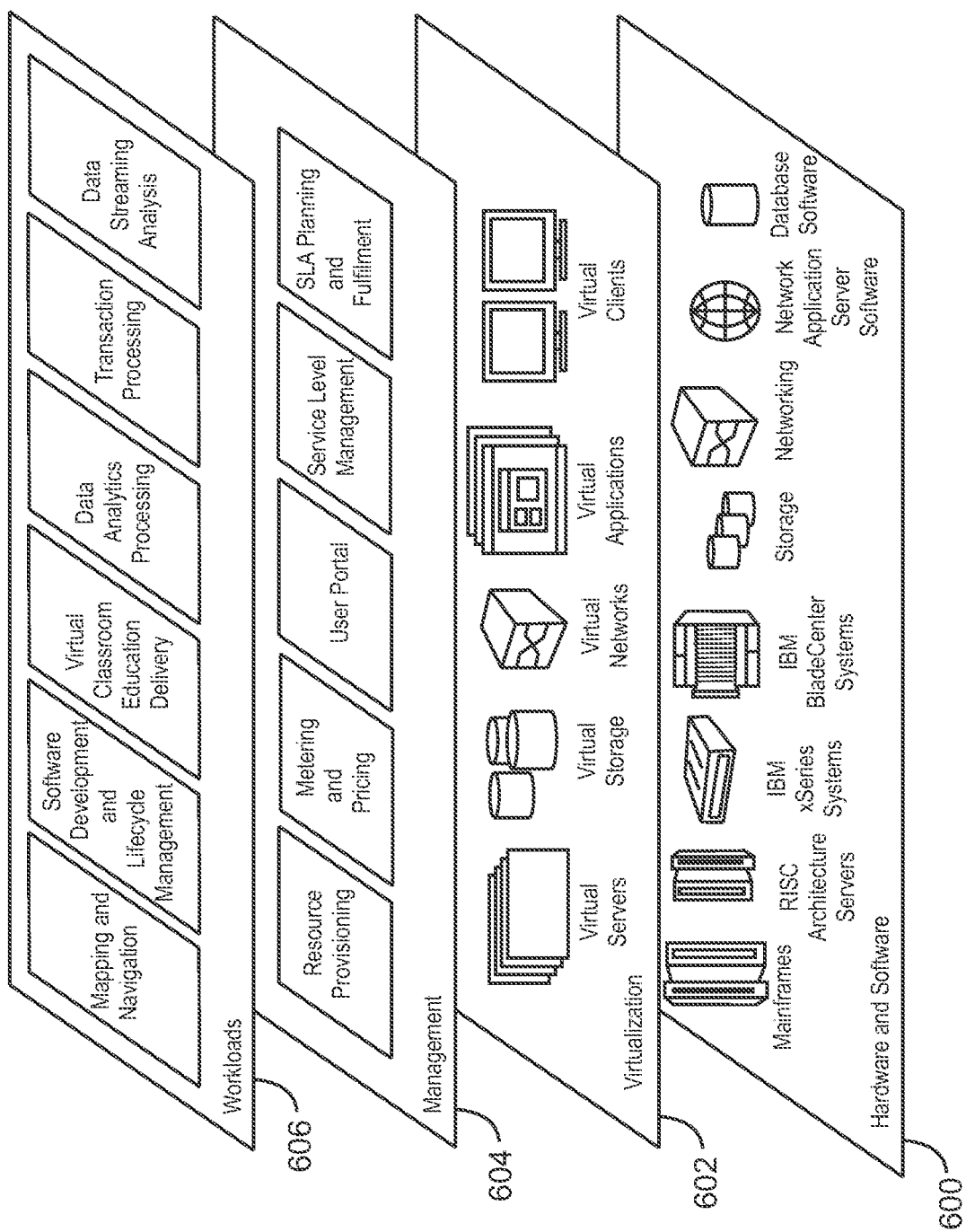
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data streaming analysis.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
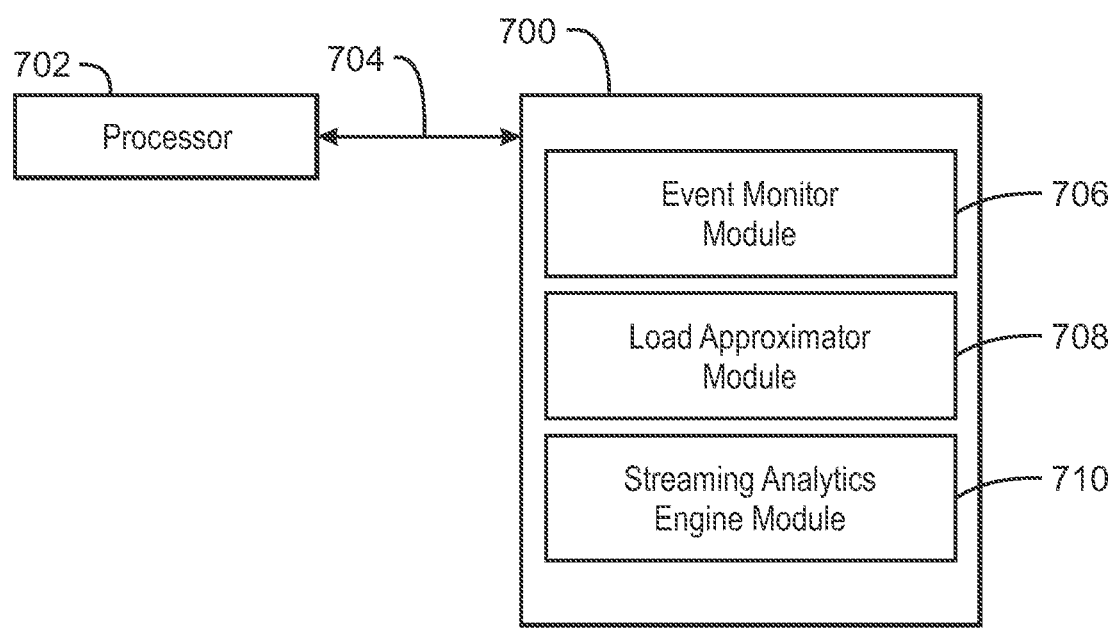
FIG. 7 is an example tangible, non-transitory computer-readable medium that can approximate activity loads in databases using smoothed time series.

Referring now to FIG. 7, a block diagram is depicted of an example tangible, non-transitory computer-readable medium 700 that can approximate activity loads in databases using smoothed time series. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, an event monitor module 706 includes code to monitor activity on a database server to generate an events stream. In some examples, the monitor module 706 includes code to separate the events stream into per-user streams or per-database streams. A load approximator module 708 includes code to convert the events stream into a time series that approximates activity load at the database server using an exponential smoothing. For example, load approximator module 708 includes code to approximate an updated activity load of the database server at each detected additional event in the events stream. The load approximator module 708 further includes code to send the events stream to a streaming analytics engine. The streaming analytics engine module 710 includes code to execute a streaming analytics engine on the time series. For example, the streaming analytics engine module 710 may include code to predict a future activity load based on the time series. In some examples, the streaming analytics engine module 710 may include code to calculate statistics on the time series to generate anomalies in real time in response to detecting that a current value of the time series exceeds a deviation threshold. In various examples, the streaming analytics engine module 710 may include code to cluster the time series with another calculated time series.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
monitor activity on a database server to generate an events stream;
convert the events stream into a time series;
approximate, in response to detecting each event in the events stream, an activity load at the database server using an exponential smoothing, a current time stamp generated at the time of each detected event, and a previous time stamp generated at a previous event time, wherein a plurality of simulated time windows for analyzing the activity load are calculated using a smoothing factor of the exponential smoothing;
send the time series to a streaming analytics engine; and
generate a trained machine learning model for the stream analytics engine for analyzing the time series using the plurality of simulated time windows in parallel.

2. The system of claim 1, wherein the processor is to monitor the activity per each user or database.

3. The system of claim 1, wherein the exponential smoothing is based on a density function of the activity load that uses a smoothing exponential average of events in the events stream.

4. The system of claim 1, wherein the exponential smoothing is calculated based on a current event timestamp and a previous event timestamp in the events stream.

5. The system of claim 1, wherein the processor is to approximate an activity load of database server for the plurality of simulated time windows in parallel.

6. The system of claim 1, wherein the processor is to approximate an updated activity load of the database server at each detected additional event in the events stream.

7. The system of claim 1, wherein the streaming analytics engine is to perform anomaly detection on the time series.

8. A computer-implemented method, comprising:
monitoring, via a processor, activity on database server to generate an events stream;
converting, via the processor, the events stream into a time series;
approximating, in response to detecting each event in the events stream, an activity load at the database server using an exponential smoothing, a current time stamp generated at the time of each detected event, and a previous time stamp generated at a previous event time, wherein a plurality of simulated time windows for analyzing the activity load are calculated using a smoothing factor of the exponential smoothing;
sending, via the processor, the time series to a streaming analytics engine; and
generating a trained machine learning model for the stream analytics engine for analyzing the time series using the plurality of simulated time windows in parallel.

9. The computer-implemented method of claim 8, further comprising separating the events stream into per-user streams or per-database streams.

10. The computer-implemented method of claim 8, further comprising receiving an adjustable smoothing factor and converting the events stream using the exponential smoothing based on the smoothing factor.

11. The computer-implemented method of claim 8, wherein converting the events stream comprises approximating an updated activity load of the database server at each detected additional event in the events stream.

12. The computer-implemented method of claim 8, wherein executing the streaming analytics engine comprises predicting a future activity load based on the time series.

13. The computer-implemented method of claim 8, wherein executing the streaming analytics engine comprises calculating statistics on the time series to generate anomalies in real time in response to detecting that a current value of the time series exceeds a deviation threshold.

14. The computer-implemented method of claim 8, wherein executing the streaming analytics engine comprises clustering the time series with another calculated time series.

15. A computer program product for approximating activity loads in databases, the computer program product comprising a computer-readable storage medium having program code embodied therewith, the program code executable by a processor to cause the processor to:
monitor activity on a database server to generate an events stream;
convert the events stream into a time series;
approximate, in response to detecting each event in the events stream, an activity load at the database server using an exponential smoothing, a current time stamp generated at the time of each detected event, and a previous time stamp generated at a previous event time, wherein a plurality of simulated time windows for analyzing the activity load are calculated using a smoothing factor of the exponential smoothing;
send the time series to a streaming analytics engine; and
generate a trained machine learning model for the stream analytics engine for analyzing the time series using the plurality of simulated time windows in parallel.

16. The computer program product of claim 15, further comprising program code executable by the processor to separate the events stream into per-user streams or per-database streams.

17. The computer program product of claim 15, further comprising program code executable by the processor to approximate an updated activity load of the database server at each detected additional event in the events stream.

18. The computer program product of claim 15, further comprising program code executable by the processor to predict a future activity load based on the time series.

19. The computer program product of claim 15, further comprising program code executable by the processor to calculate statistics on the time series to generate anomalies in real time in response to detecting that a current value of the time series exceeds a deviation threshold.

20. The computer program product of claim 15, further comprising program code executable by the processor to cluster the time series with another calculated time series.

* * * * *